United States Patent
Boughtwood (10) Patent No.: US 12,166,442 B2
(45) Date of Patent: Dec. 10, 2024

(54) ELECTRIC MOTOR SYSTEM

(71) Applicant: Martin Hugh Boughtwood, Mid Glamorgan (GB)

(72) Inventor: Martin Hugh Boughtwood, Mid Glamorgan (GB)

(73) Assignee: DEREGALLERA HOLDINGS LTD (GB)

( * ) Notice: Subject to any disclaimer, the term of this patent is extended or adjusted under 35 U.S.C. 154(b) by 176 days.

(21) Appl. No.: 17/910,152

(22) PCT Filed: Mar. 2, 2021

(86) PCT No.: PCT/EP2021/055204
§ 371 (c)(1),
(2) Date: Sep. 8, 2022

(87) PCT Pub. No.: WO2021/180518
PCT Pub. Date: Sep. 16, 2021

(65) Prior Publication Data
US 2023/0102176 A1  Mar. 30, 2023

(30) Foreign Application Priority Data

Mar. 9, 2020  (GB) .................................... 2003398

(51) Int. Cl.
*H02P 25/22* (2006.01)
(52) U.S. Cl.
CPC .................... *H02P 25/22* (2013.01)
(58) Field of Classification Search
CPC .......... H02P 27/00; H02P 27/04; H02P 27/06; H02P 27/08; H02P 27/085; H02P 29/00;
(Continued)

(56) References Cited

U.S. PATENT DOCUMENTS

2004/0090130 A1*  5/2004  Kaneko ................. H02K 11/33
 310/58
2012/0274246 A1* 11/2012  Radulescu ............. B60L 53/14
 318/139
(Continued)

FOREIGN PATENT DOCUMENTS

CN  110460295 A  11/2019
DE  102013208583 A1  11/2014
(Continued)

OTHER PUBLICATIONS

PCT Application No. PCT/EP2021/055204, International Search Report and Written Opinion, mailed Jun. 24, 2021, 13 pp.

*Primary Examiner* — Antony M Paul
(74) *Attorney, Agent, or Firm* — BKRIP LLC (57) ABSTRACT

An electric motor system (100), comprising: a motor unit (110) comprising: a first part (120); a second part (130) movable relative to the first part (120); a plurality of spaced activatable motor elements (140) provided on the first part (120), each activatable motor element (140) being operative when activated by application of an electric current thereto for creating relative movement between the first and second parts (120, 130); and a plurality of power electronics drive modules (150), each power electronics drive module (150) being operatively associated with a different subset of the plurality of activatable motor elements (140) and comprising a power converter (155) operative to convert direct current into a periodic current for powering the activatable motor elements (140); and a power supply arrangement (170) comprising: at least one direct current power source (180); and a plurality of n parallel direct current power supply lines (190), each of the parallel direct current power supply lines (190) being operative to transmit direct current from the at least one direct current power sources (180) to a different
(Continued)

subset of the plurality of power electronics drive modules (150).

26 Claims, 4 Drawing Sheets

(58) Field of Classification Search
CPC .......... H02P 29/40; H02P 29/60; H02P 29/64; H02P 29/68; H02P 2101/30; H02P 2101/35; H02P 6/08; H02P 6/12; H02P 6/14; H02P 6/28; H02P 6/32; H02P 1/26; H02P 1/42; H02P 1/46; H02P 21/22; H02P 2101/45; H02P 9/30; H02P 25/03; H02P 2207/05; H02P 6/085; H02P 25/022; H02P 7/29; H02K 35/02; H02K 35/00; H02K 3/28; H02K 1/27; H02K 41/03; H02K 1/16; H02K 11/33; H02K 2201/03; H02K 99/20
See application file for complete search history.

(56) References Cited

U.S. PATENT DOCUMENTS

| | | | |
|---|---|---|---|
| 2017/0274992 A1* | 9/2017 | Chretien | H02K 11/33 |
| 2018/0079515 A1* | 3/2018 | Harwood | H02J 3/472 |
| 2020/0164755 A1* | 5/2020 | Smolenaers | B60L 53/53 |

FOREIGN PATENT DOCUMENTS

| | | |
|---|---|---|
| DE | 102017209991 A1 | 12/2018 |
| GB | 2456349 A | 7/2009 |
| GB | 2557203 A | 6/2018 |
| WO | 2008007120 A2 | 1/2008 |
| WO | 2018077549 A1 | 5/2018 |
| WO | 2018108357 A1 | 6/2018 |

* cited by examiner

ELECTRIC MOTOR SYSTEM

The present invention relates to an electric motor system, particularly but not exclusively to an electric motor system for providing propulsion to an electric vehicle and other forms of electrically-propelled transport.

Figure 1:
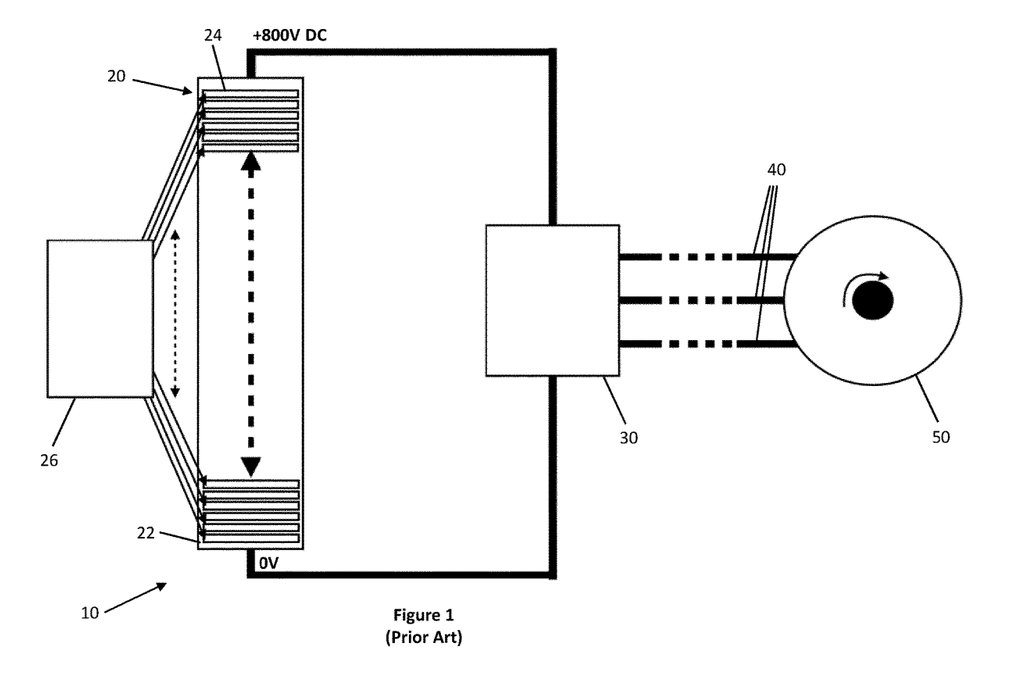
FIG. 1 is a schematic illustration of a prior art electric vehicle motor system.

FIG. 1 shows a conventional motor power control system 10 for an electric vehicle comprising a battery supply 20 feeding a 3-phase inverter 30 which in turn feeds power via supply lines 40 to a 3-phase phase rotary motor 50.

Battery supply 20 comprises a rechargeable battery unit 22 plurality of battery cells 24 (e.g. 200×100 Ahr cells) arranged in series to generate a 800V direct current supply for 3-phase inverter 30. A battery management system (BMS) 26 is provided in conjunction with battery supply 20 to monitor and adjust the state of the rechargeable battery unit 22.

As illustrated, 3-phase inverter 30 is operative to convert the direct current supply into 3 phases of alternating current (each phase 800V and 1000 A peak) for transmission along alternating current supply lines 40 to the three separate phases of activatable electromagnet coils provided rotary motor 50.

In a typical vehicle, there is a wide range of speed and torque required to deal with normal operation—in a road going vehicle, high speed for motorway use, high torque for steep hills and heavy loads. Historically this operational range has been facilitated by a selectable set of gearing. However for optimum efficiency, reduction of wear and maintenance, it is desirable to avoid (or at least minimise) use of gearing in electric vehicles.

In order to provide sufficient headroom in terms of voltage and current in an electric vehicle—voltage to reach the desired motor top speed and current to reach the top force/torque—the battery unit 22 has to be both of sufficient voltage and current capacity to deal with the specified maximum speed and torque of the vehicle. Additionally, in order to provide the range of speed and torque the battery and power electronics must be able to supply and handle the full range of voltage and current. Typically 400V to 800V can be necessary in order to achieve the top speed of a 3-phase motor.

Typically motors are wound with multiple electromagnet coils in series—this allows a single or low number of inverters to power the whole machine, but carries the consequence of needing high voltage to overcome the summation of series coils back emfs. The higher voltage comes with a number of consequences. Firstly the power electronics must be voltage rated comfortably above the source voltage to ensure fail-safe switching. Higher voltage switches come with more loss both in on-state conduction and switching losses. Higher voltage requires stronger insulation on all motor coils and thus leaves less space for conductor copper. Higher voltage results in high capacitive coupling to ground which in turn causes more losses and EMI issues. This is particularly severe when for efficiency purposes the semiconductor switches are arranged to switch faster, resulting in greater dV/dt that both stresses insulation by raising ionization and increases capacitive coupling to ground increasing EMI and losses. Higher voltage also requires larger DC link capacitors increasing inverter volume and mass.

Typically higher voltage devices are IGBTs or Sic switches. These carry a relatively constant voltage drop in the order of 2V per device. Conversely lower voltage switches—200V or lower—are typically Mosfet devices. These devices have a resistive loss, thus a larger current device has a lower resistance and hence lower loss. However these devices are not able to handle the voltages necessary to allow high speed from series connected coils unless the series coils are wound with a much lower number of turns—to limit the summation back emf. This option would require the use of very high current devices and suffer from large coil conductors, large cables and large resistive $I^2R$ losses.

Due to the high voltages/current involved, great care must be taken to ensure safe installation and safety to occupants during any accident such as a vehicle crash.

The present applicant has identified an improved motor system design that provides an enhanced efficiency and safer performance over the prior art.

In accordance with the present invention, there is provided an electric motor system, comprising: a motor unit comprising: a first part; a second part movable relative to the first part; a plurality of spaced activatable motor elements provided on the first part, each activatable motor element being operative when activated by application of an electric current thereto for creating relative movement between the first and second parts; and a plurality of power electronics drive modules, each power electronics drive module being operatively associated with a different subset of the plurality of activatable motor elements and comprising a power converter operative to convert direct current into a periodic current (e.g. pulsed direct current or an alternating current) for powering the activatable motor elements; and a power supply arrangement comprising: at least one direct current power source; and a plurality of n parallel direct current power supply lines, each of the parallel direct current power supply lines being operative to transmit direct current from the at least one direct current power source to a different subset of the plurality of power electronics drive modules.

In this way, an electric motor system may be provided in which the activatable motor elements and associated power electronics are connected in parallel to a plurality of (e.g. low-voltage) power supply sources and lines offering enhanced redundancy and reduced power handling. In particular, the activatable motor elements and power electronics may be configured for low voltage operation which may offer higher efficiency than high voltage equivalents (e.g. in scenarios in which low voltage power switches are more efficient than equivalent high voltage devices). Thus by optimal choice of voltage, winding and connection type, a parallel low voltage system can be realised with very large reductions in loss, e.g. potentially in the order of 5 or more times less loss.

In one embodiment, the plurality of activatable motor elements are divided into a plurality of p phase groups, wherein each phase group receives current (e.g. from the power electronics drive module) at a different time to the other phase groups.

In one embodiment, $p \geq 2$ (e.g. $p \geq 3$).

In one embodiment, $n > p$ (e.g. $n > 2p$).

In one embodiment, there are a plurality of q power electronics drive modules.

In one embodiment, $q > p$ (e.g. $q > 2p$).

In one embodiment, $q \geq n$ (e.g. $q \geq 2n$).

In one embodiment, the plurality of q power electronics drive modules are provided on the first part.

In one embodiment, each power electronics drive module is operatively associated with an individual activatable motor element or sub group of motor elements.

In one embodiment, each power electronics drive module is operatively associated with a plurality m of activatable motor elements (e.g. wherein each of them activatable motor elements are local to the respective power electronic drive module).

In one embodiment, m=p.

In one embodiment, the plurality of parallel direct current power supply lines extend substantially from the at least one direct current power source to the motor unit.

In one embodiment, the at least one direct current power source comprises a direct generator-derived power source (e.g. from a distributed power grid or from a local (e.g. on-board) generator).

In one embodiment, the at least one direct current power source comprises at least one dischargeable power storage device (e.g. dischargeable battery or dischargeable fuel cell).

In one embodiment, the at least one dischargeable power storage device is rechargeable (e.g. rechargeable battery or rechargeable fuel cell, or rechargeable capacitor or capacitors).

In one embodiment, the at least one direct current power source comprises a plurality of direct current power sources (e.g. a plurality of k direct current power sources).

In one embodiment, the at least one direct current power source comprises a plurality of dischargeable power storage devices (e.g. a plurality of k dischargeable power storage devices).

In one embodiment, the at least one direct current power source comprises a plurality of rechargeable power storage devices (e.g. a plurality of k rechargeable power storage devices).

In one embodiment, each of the plurality of direct current sources (e.g. plurality of k direct current power sources) is associated with (e.g. electrically connected to) a different one of the plurality of n parallel direct current power supply lines.

In one embodiment, n≥k (e.g. n≥k or n=k).

In one embodiment, k>p (e.g. k>2p).

In one embodiment, q≥k (e.g. q≥2k).

Typically, each of the plurality of n parallel direct current power supply lines comprises a supply line and a return line.

In one embodiment, each of the plurality of n parallel direct current power supply lines is operative to transmit a low voltage (e.g. substantially 200 volts or less, e.g. substantially 150 volts or less, e.g. substantially 100 volts or less, e.g. substantially 50 volts or less) to the motor unit (e.g. to its respective subset of the plurality of power electronics drive modules).

Typically, each of the plurality of n parallel direct current power supply lines is electrically insulated from (e.g. and separated from) the other of the n parallel direct current power supply lines (e.g. e.g. supply line is provided inside an electrically insulating sheath or the like).

In one embodiment, the plurality of dischargeable power storage devices are each low voltage devices (e.g. operative to provide a voltage of substantially 200 volts or less, e.g. substantially 150 volts or less, e.g. substantially 100 volts or less, e.g. substantially 50 volts or less).

In one embodiment, each dischargeable power source device (e.g. each battery) has its own integrated (e.g. substantially low voltage) management system (e.g. integrated battery management system) operative to monitor (e.g. monitor and adjust) the state of the dischargeable power source device.

In one embodiment, the activatable motor elements are activatable electromagnet elements (e.g. elements including at least one electrically conductive coil operative to generate a magnetic field upon activation).

In one embodiment, the activatable motor elements are activatable electrostatic elements (e.g. elements including at least one electrically conductive element operate to generate an electric field upon activation).

In one embodiment, the power converter is an AC converter (e.g. inverter) operative to convert direct current into alternating current.

In another embodiment, the power converter is a pulsed DC converter (e.g. switch or modulator arrangement) operative to convert direct current into a pulsed direct current.

In one embodiment, the power converter of each power electronics drive module is a single-phase power converter (e.g. H-bridge power converter), e.g. for connection to one or more activatable motor elements associated with a single phase group. For example, in the case of an AC converter the AC converter may be a single-phase AC converter (e.g. H-bridge inverter).

In one embodiment, the power converter is a multi-phase power converter (e.g. 3-phase power converter or higher phase power converter), e.g. for connection to multiple activatable motor elements each activatable motor element being associated with a different phase group. For example, in the case of an AC converter the AC converter may be a 3-phase or higher phase inverter.

In one embodiment, the motor unit is a rotary motor unit.

In one embodiment, the motor unit is a linear motor unit.

In one embodiment, the first part is a movable (e.g. rotor) part and the second part is a stator part.

In one embodiment, the first part is a stator part and the second part is a movable (e.g. rotor) part.

In one embodiment, each power electronics drive module comprises a local control circuit operative to control current supply to the activatable motor element(s) under its control.

In one embodiment, each local control circuit is operative to sense the relative position of the first part relative to the second part and to (e.g. independently) determine the optimum timing and magnitude of current to be delivered to the activatable motor element(s) under its control. In this way, each power electronics module may be operative to independently synchronise its operation to maximise force and minimise loss whilst providing complete independence/redundancy.

In one embodiment, the electric motor system is an electrical vehicle propulsion motor system, an electric aircraft propulsion motor system or an electric watercraft propulsion motor system.

Embodiments of the present invention will now be described by way of example with reference to the accompanying drawings in which.

Figure 2A:
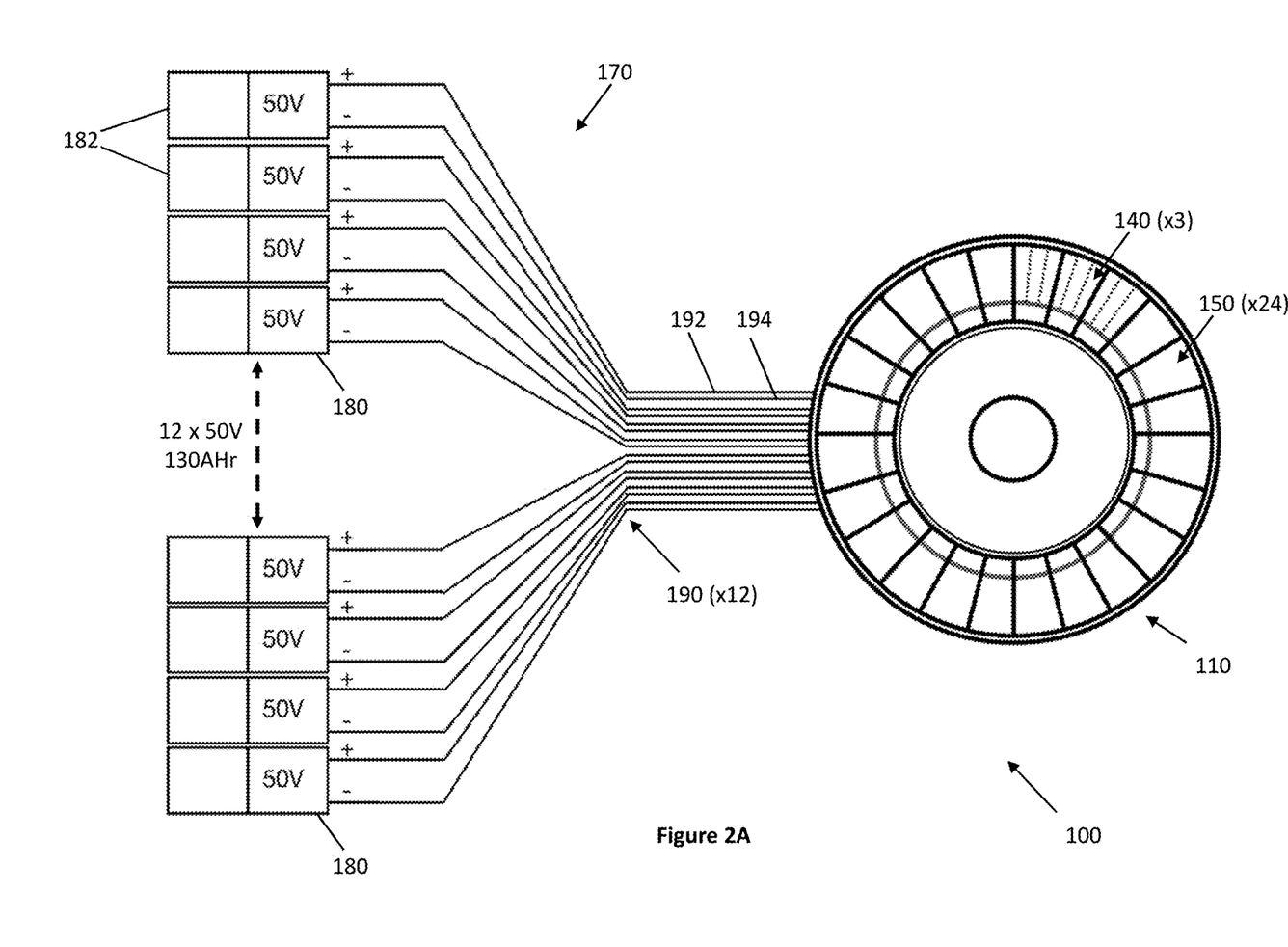
FIG. 2A is a schematic illustration of an electric motor system in accordance with an embodiment of the present invention.
Figure 2B:
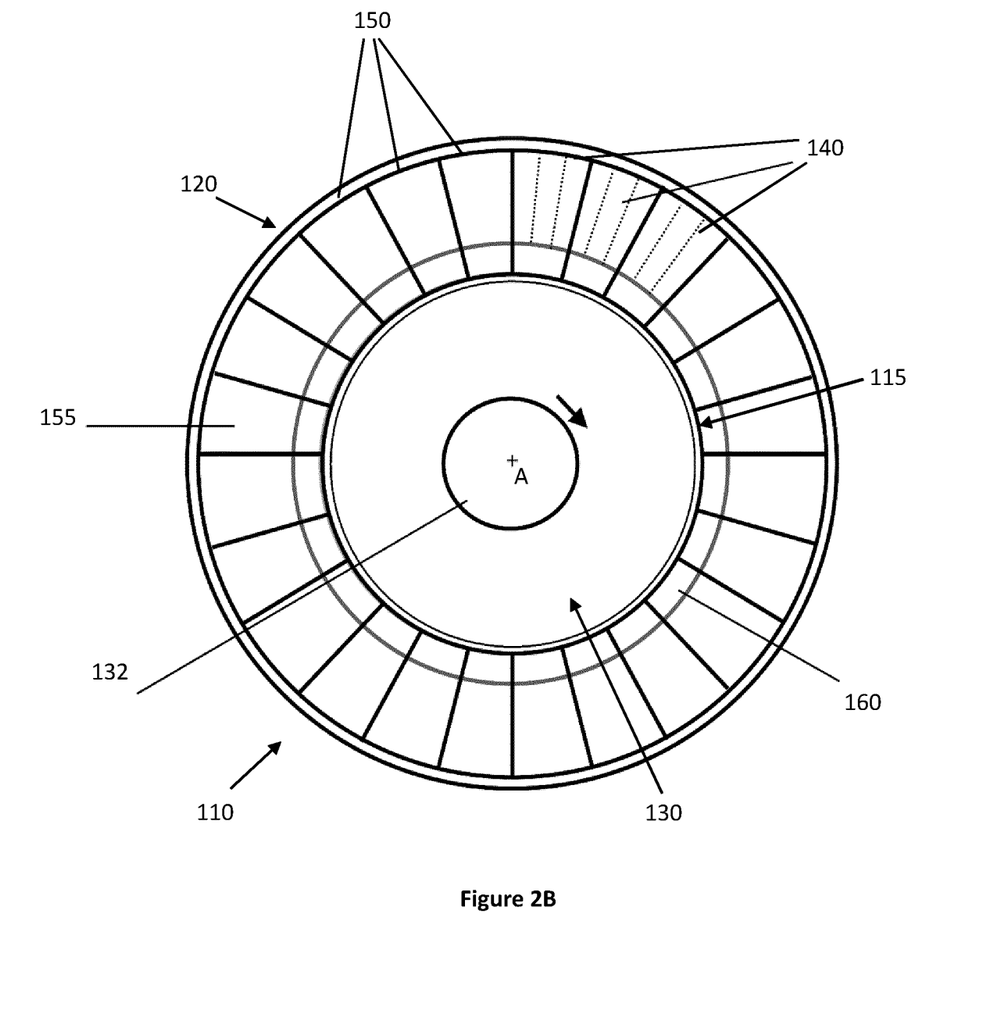
FIG. 2B is a schematic view of the electric motor of the electric motor system of FIG. 2A.

FIGS. 2A and 2B together show details of an electric motor system 100 comprising a p-phase rotary motor unit 110 and a direct current power supply arrangement 170.

Rotary motor unit 110 comprises a radially outer stator 120 and a radially inner rotor 130 separated from stator 120 by an active airgap 115 and rotatable relative to the stator 120 about a rotary axis "A", rotor 130 being operative to drive rotation of an output shaft 132 extending along rotary axis "A". Stator 120 supports a plurality of m circumferentially-spaced independently activatable motor coil elements 140, a plurality of integral circumferentially spaced segmented power electronics drive modules 150 and a low current power distribution ring 160 operative to distribute power to each power electronics drive module 150.

Each segmented power electronics drive module 150 is operatively associated with a different subset m of the plurality of activatable motor coil elements 140 and comprises power converter electronics in the form of a 3-phase inverter module 155 operative to convert direct current into a 3-phase alternating current for powering the activatable motor coil elements 140. Each activatable motor coil element 140 is operative when activated by application of an electric current thereto to apply a magnetic flux across active air gap 115 for creating relative movement between the rotor 130 and stator 120. In this embodiment the activatable motor elements are activatable electromagnet elements (e.g. elements including at least one electrically conductive coil operative to generate a magnetic field upon activation) but in the case of an electrostatic motor the activatable motor elements would be activatable electrostatic elements (e.g. elements including at least one electrically conductive element operate to generate an electric field upon activation).

Returning to FIG. 2A, direct current power supply arrangement 170 comprises a plurality of k rechargeable low voltage (50V, 130 AHr) batteries 180; and a plurality of n parallel direct current power supply lines 190, each of the n parallel direct current power supply lines 190 extending substantially from a respective rechargeable battery 180 to which it is connected to the motor unit 110. In this specific example, p=m=3, k=n=12 (for simplicity only 8 of the 12 rechargeable batteries 180 and 8 of the 12 direct current power supply lines 190 are depicted) and q=24.

Each of the plurality of n parallel direct current power supply lines 190 comprises a supply line 192 and a return line 194 and is operative to transmit direct current from its respective rechargeable battery 180 to a different subset of the plurality of power electronics drive modules 150. Each direct current supply line 190 may be carried in a separately insulated cable or conduit for enhanced redundancy. As illustrated, each rechargeable battery 180 is provided with its own independent integrated battery management system 182 operative to monitor the state of the battery 180.

Each of the q 3-phase inverter modules 155 is operative (at 50V, 120 A) to convert direct current into alternating current and are integrated into the stator 120. However, for applications where the direction of the current used to activate the motor elements is not important, each invertor module may equally take the form of a pulsed DC converter (e.g. switch or modulator arrangement) operative to convert direct current into a pulsed direct current. Each battery 180 supplies electrical power to a different pair of 3-phase inventor modules (i.e. there are 2 inverter modules per 50V battery block) and each 3-phase inverter module 155 is in turn connected directly to a group of three local activatable motor coil elements 140 (one for each of the 3 motor phases).

Although a plurality of k rechargeable batteries are shown (as would be required for typical transport applications), depending upon the application potentially the direct current power source could comprises a single power source, e.g. a single direct generator-derived power source (e.g. from a distributed power grid or from a local (e.g. on-board) generator) or a single battery source with the plurality of n parallel direct current power supply lines 190 connected to the single power source. However, since the activatable motor coil elements 140 and power converter electronics 160 are configured for low voltage operation it is desirable for redundancy purposes to utilise separate low voltage direct current power sources (here k low voltage batteries 172). Thus the entire system becomes parallel from source through cables, through electronics to motor coils and permits each of the separate low voltage direct current power sources to be independently managed via a respective simple low voltage battery management system 182 that can be easily integrated with the battery. Each battery/battery management system combination may be readily exchangeable (even a spare can be carried for extreme situations) in the event of any failure. In contrast, the battery supply for a high voltage system large enough to power a vehicle typically must be integrated into the vehicle architecture to such an extent that its removal is a major repair and requires a suitably isolated battery management system structured to handle hundreds of battery cells.

As the current control by the power stage needs to synchronise with the rotor 130, each power electronics drive module 150 may include a local control circuit operative to control current supply to the activatable motor element(s) under its control. Each local control circuit may be operative to sense the relative position of the rotor 130 relative to the stator 120 and to independently determine the optimum timing and magnitude of current to be delivered to the activatable motor coil elements 140 under its control for optimum force/torque generation.

Advantageously, since the parallel connection to the power electronics drive modules 150 is achieved local to the motor unit 110 (i.e. the power electronics drive modules are integrated into the motor unit), this removes the need for any high currents to be carried over cables to the motor unit. Furthermore, in providing a motor unit 110 with multiple discrete activatable motor coil elements 140, it can be arranged such that an optimum number of turns is would for each coil. Instead of series connecting the coil as in a conventional system, the coils can be connected singly or in short series groups of only 2 or 3 coils or in parallel to their respective inverter module 155.

Since low voltage power switches such as Mosfets, with an intrinsic resistive drop, are more efficient than higher voltage devices that have a fixed voltage drop when connected to handle current in parallel, by optimal choice of voltage, winding, and connection method a parallel low voltage system can realise very large reductions in loss. In a typical case this would be of the order of at least 2 to 20 times less loss.

For example, comparing the inverter losses of prior art electric motor system 10 of FIG. 1 to the electric motor system 100 for a motor with 72 coils, each machine running at the same speed and developing the same force.

In the first case (electric motor system 10) there would be 24 coils in series for each leg of a star-connected 3-phase system. This effectively presents 48 coils simultaneously across the supply. If there is 1 turn per coil this gives 48 coil turns to equate to indicated 800v supply.

In the second case (electric motor system 100) the 72 coils are again divided into 3 phase groups of 24 coils, but each low voltage supply is star connected to 2 coils in series instead of 48 coils. With no change in current this would allow the voltage to be $\frac{1}{24}^{th}$ of the voltage of electric motor system 10 (e.g. 33v). Thus there would be 24×33 v device sets in parallel.

However, Mosfet devices can readily operate up to 100 v or 200 v. Thus, an optimum voltage of, for example, 150V would allow 4 coil turns instead of 1 and lower the current rating of one device to 250 A instead of 1000 A.

Additionally low voltage Mosfets are able to switch faster—both due to the fact that they have to slew over a smaller voltage range (which even if speed of switching was proportional to high voltage devices, would in this example provide 3 times less loss) and also due to the fact that they are intrinsically faster due to manufacturing factors. Thus a double gain on switching loss is achieved.

The comparison in potential losses may be assessed in more detail with reference to the follow calculation:

Conventional Electric Motor System 10:

Losses in conventional 800V inverter typically 4V drop (2V×2 switches)×1000 A current=4000 W PWM switching losses=circa 4000 W
Total=8000 W
Parallel Low Voltage Electric Motor System 100:

Mosfet resistance—circa 500 micro Ohm per 250 A device, equal to (in a star-connected 3 coil group) 500+(500+500) (resistance sum is one coil in series plus two coils in parallel)=750 micro Ohm×250 A$^2$ current=47 W×

24 inverters=750 W (assuming ⅔ are active at any time)

PWM switching losses=circa 250 W
Total=1000 W

Accordingly, electric motor system 100 provides the potential for up to 8 time less inverter loss for the same motor torque compared with prior art electric motor system 10.

In this way, an electric drive system of improved efficiency and improved reliability and improved safety is provided comprising a multi-section motor powered by a plurality of power electronic drive modules whose power is in turn provided via a plurality of supply cables and by a plurality of supply sources such as battery modules or mains derived DC supplies.

In one embodiment of the invention, the electric motor system 100 is configured as an electrical vehicle propulsion motor system (e.g. operative to drive one or more wheels of a wheel-driven vehicle). In another embodiment, the electric motor system 100 may be configured to as an electric aircraft propulsion motor system operative to drive propulsion of an electric aircraft (e.g. drive propeller or lift-generating rotor of an electric aircraft) or an electric watercraft propulsion motor system operative to drive propulsion of an electric watercraft (e.g. drive a propeller or propellers thereof).

Figure 3:
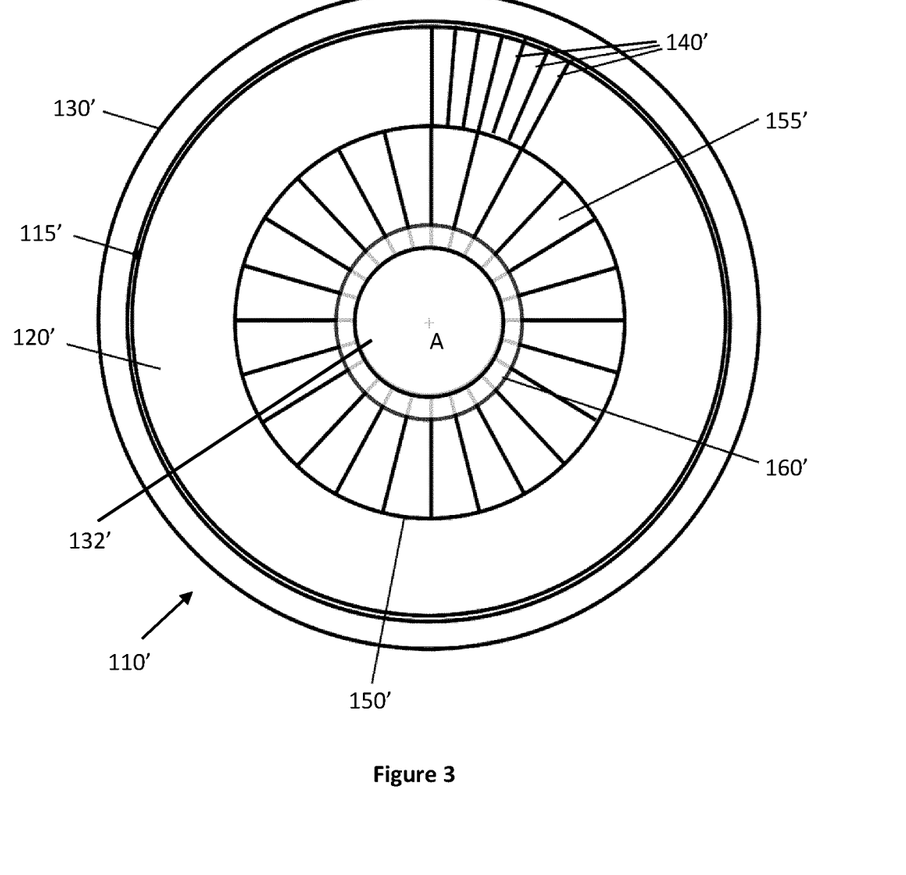
FIG. 3 is a schematic view of an alternative electric motor for use in the electric motor system of FIG. 2A.

FIG. 3 shows one example of an alternative p-phase rotary motor unit 110' for use in the electric motor system 100 an alternative to motor unit 110 (features in common are labelled accordingly). Whereas motor unit 110 has an internal rotor 130 and the segmented power electronics drive modules 150 are located axially adjacent to activatable motor coil elements 140, in motor unit 110' rotor 130' is an external rotor and the segmented power electronics drive modules 150' are located radially inside the stator 120'.

The invention claimed is:

1. An electric motor system, comprising:
   a motor unit comprising:
   a first part;
   a second part movable relative to the first part;
   a plurality of spaced activatable motor elements provided on the first part, each activatable motor element being operative when activated by application of an electric current thereto for creating relative movement between the first and second parts; and
   a plurality of power electronics drive modules, each power electronics drive module being operatively associated with a subset of the plurality of activatable motor elements and comprising a power converter operative to convert direct current into a periodic current for powering the activatable motor elements; and
   a power supply arrangement comprising:
   at least one direct current power source; and
   a plurality of n parallel direct current power supply lines, each of the parallel direct current power supply lines being operative to transmit direct current from the at least one direct current power source to a subset of the plurality of power electronics drive modules;
   wherein:
   each power electronics drive module comprises a local control circuit operative to control current supply to the activatable motor element(s) under its control; and
   each local control circuit is operative to sense the relative position of the first part relative to the second part and to determine the optimum timing and magnitude of current to be delivered to the activatable motor element(s) under its control.

2. An electric motor system according to claim 1, wherein the plurality of activatable motor elements are divided into a plurality of p phase groups, wherein each phase group receives current at a different time to the other phase groups.

3. An electric motor system according to claim 2, wherein n>p.

4. An electric motor system according to claim 2, wherein there are a plurality of q power electronics drive modules and q>p.

5. An electric motor system according to claim 1, wherein the at least one direct current power source comprises at least one dischargeable power storage device.

6. An electric motor system according to claim 1, wherein the at least one direct current power source comprises a plurality of dischargeable power storage devices.

7. An electric motor system according to claim 6, wherein each of the plurality of dischargeable power storage devices is associated with a different one of the plurality of n parallel direct current power supply lines.

8. An electric motor system according to claim 6, wherein the plurality of dischargeable power storage devices are each low voltage devices operative to provide a voltage of substantially 200 volts or less.

9. An electric motor system according to claim 6, wherein each dischargeable power source device has its own integrated management system operative to monitor and optionally adjust the state of the dischargeable power source device.

10. An electric motor system according to claim 1, wherein the power converter is an AC converter operative to convert direct current into alternating current.

11. An electric motor system according to claim 1, wherein the power converter is a pulsed DC converter operative to convert direct current into a pulsed direct current.

12. An electric motor system according to claim 1, wherein the electric motor system is an electrical vehicle propulsion motor system, an electric aircraft propulsion motor system, or an electric watercraft propulsion motor system.

13. An electric motor system, comprising:
   a motor unit comprising:
   a first part;
   a second part movable relative to the first part;

a plurality of spaced activatable motor elements provided on the first part, each activatable motor element being operative when activated by application of an electric current thereto for creating relative movement between the first and second parts; and a plurality of power electronics drive modules, each power electronics drive module being operatively associated with a subset of the plurality of activatable motor elements and comprising a power converter operative to convert direct current into a periodic current for powering the activatable motor elements; and a power supply arrangement comprising:

at least one direct current power source; and a plurality of n parallel direct current power supply lines, each of the parallel direct current power supply lines being operative to transmit direct current from the at least one direct current power source to a subset of the plurality of power electronics drive modules;

wherein the plurality of activatable motor elements are divided into a plurality of p phase groups, wherein each phase group receives current at a different time to the other phase groups.

14. An electric motor system according to claim 13, wherein n>p.

15. An electric motor system according to claim 13, wherein there are a plurality of q power electronics drive modules and q>p.

16. An electric motor system according to claim 13, wherein the electric motor system is an electrical vehicle propulsion motor system, an electric aircraft propulsion motor system or an electric watercraft propulsion motor system.

17. An electric motor system according to claim 16, wherein the plurality of dischargeable power storage devices are each low voltage devices operative to provide a voltage of substantially 200 volts or less.

18. An electric motor system according to claim 16, wherein each dischargeable power source device has its own integrated management system operative to monitor and optionally adjust the state of the dischargeable power source device.

19. An electric motor system according to claim 16, wherein the electric motor system is an electrical vehicle propulsion motor system, an electric aircraft propulsion motor system or an electric watercraft propulsion motor system.

20. An electric motor system, comprising:

a motor unit comprising:

a first part;

a second part movable relative to the first part;

a plurality of spaced activatable motor elements provided on the first part, each activatable motor element being operative when activated by application of an electric current thereto for creating relative movement between the first and second parts; and a plurality of power electronics drive modules, each power electronics drive module being operatively associated with a subset of the plurality of activatable motor elements and comprising a power converter operative to convert direct current into a periodic current for powering the activatable motor elements; and a power supply arrangement comprising:

at least one direct current power source; and a plurality of n parallel direct current power supply lines, each of the parallel direct current power supply lines being operative to transmit direct current from the at least one direct current power source to a subset of the plurality of power electronics drive modules;

wherein:

the at least one direct current power source comprises a plurality of dischargeable power storage devices; and each of the plurality of dischargeable power storage devices is associated with a different one of the plurality of n parallel direct current power supply lines.

21. An electric motor system, comprising:

a motor unit comprising:

a first part;

a second part movable relative to the first part;

a plurality of spaced activatable motor elements provided on the first part, each activatable motor element being operative when activated by application of an electric current thereto for creating relative movement between the first and second parts; and a plurality of power electronics drive modules, each power electronics drive module being operatively associated with a subset of the plurality of activatable motor elements and comprising a power converter operative to convert direct current into a periodic current for powering the activatable motor elements; and a power supply arrangement comprising:

at least one direct current power source; and a plurality of n parallel direct current power supply lines, each of the parallel direct current power supply lines being operative to transmit direct current from the at least one direct current power source to a subset of the plurality of power electronics drive modules;

wherein:

the at least one direct current power source comprises a plurality of dischargeable power storage devices; and each dischargeable power source device has its own integrated management system operative to monitor and optionally adjust the state of the dischargeable power source device.

22. An electric motor system according to claim 21, wherein each of the plurality of dischargeable power storage devices is associated with a different one of the plurality of n parallel direct current power supply lines.

23. An electric motor system according to claim 21, wherein the plurality of dischargeable power storage devices are each low voltage devices operative to provide a voltage of substantially 200 volts or less.

24. An electric motor system according to claim 21, wherein the electric motor system is an electrical vehicle propulsion motor system, an electric aircraft propulsion motor system or an electric watercraft propulsion motor system.

25. An electric motor system, comprising:

a motor unit comprising:

a first part;

a second part movable relative to the first part;

a plurality of spaced activatable motor elements provided on the first part, each activatable motor element being operative when activated by application of an electric current thereto for creating relative movement between the first and second parts; and a plurality of power electronics drive modules, each power electronics drive module being operatively associated with a subset of the plurality of activatable motor elements and comprising a power converter operative to convert direct current into a periodic current for powering the activatable motor elements; and a power supply arrangement comprising:

at least one direct current power source; and a plurality of n parallel direct current power supply lines, each of the parallel direct current power supply lines being operative to transmit direct current from the at least one direct current power source to a subset of the plurality of power electronics drive modules;

wherein the power converter is a pulsed DC converter operative to convert direct current into a pulsed direct current.

26. An electric motor system according to claim 25, wherein the electric motor system is an electrical vehicle propulsion motor system, an electric aircraft propulsion motor system or an electric watercraft propulsion motor system.

\* \* \* \* \*